United States Patent
Shi

(10) Patent No.: US 9,031,297 B2
(45) Date of Patent: May 12, 2015

(54) ALTERNATIVE NOISE MAP ESTIMATION METHODS FOR CT IMAGES

(71) Applicants: Kabushiki Kaisha Toshiba, Tokyo (JP); Toshiba Medical Systems Corporation, Otawara-Shi, Tochigi-Ken (JP)

(72) Inventor: Daxin Shi, Vernon Hills, IL (US)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 18 days.

(21) Appl. No.: 13/757,041

(22) Filed: Feb. 1, 2013

(65) Prior Publication Data

US 2014/0219529 A1  Aug. 7, 2014

(51) Int. Cl.
  *G06K 9/00*  (2006.01)
  *G06T 11/00*  (2006.01)
  *G21K 3/00*  (2006.01)

(52) U.S. Cl.
  CPC .................................... *G06T 11/003* (2013.01)

(58) Field of Classification Search
  USPC ......... 382/100, 103, 128–134, 162, 168, 172, 382/173, 181, 232, 254–255, 274–276, 291, 382/305, 312; 378/4, 5, 21, 156
  See application file for complete search history.

(56) References Cited

U.S. PATENT DOCUMENTS

| | | | | |
|---|---|---|---|---|
| 6,493,416 | B1 * | 12/2002 | Hsieh | 378/4 |
| 7,706,497 | B2 * | 4/2010 | Hsieh et al. | 378/5 |
| 8,538,114 | B2 * | 9/2013 | Yang et al. | 382/131 |
| 2008/0095462 | A1 * | 4/2008 | Hsieh et al. | 382/275 |
| 2009/0232269 | A1 | 9/2009 | Hsieh et al. | |
| 2012/0308104 | A1 * | 12/2012 | Yang et al. | 382/131 |
| 2012/0321157 | A1 * | 12/2012 | Yang et al. | 382/131 |

FOREIGN PATENT DOCUMENTS

| | | |
|---|---|---|
| JP | 2006-116137 A | 5/2006 |
| JP | 2012-250043 A | 12/2012 |
| WO | 2011/064683 A2 | 6/2011 |
| WO | 2012/173205 A1 | 12/2012 |

OTHER PUBLICATIONS

International Search Report and International Preliminary Report on Patentability for International Patent Application No. PCT/ JP2014/ 052036 mailed on Apr. 8, 2014.

* cited by examiner

*Primary Examiner* — Seyed Azarian
(74) *Attorney, Agent, or Firm* — Yoshida & Associates, LLC

(57) ABSTRACT

Noise map for CT images have been estimated by generalizing the prior art even-and-odd views approach. One example is to estimate a noise map from images reconstructed from three sets of independent views. A second example is to estimate a noise map from images reconstructed by using two sets of correlated views. A third example is to estimate a noise map from noise map from two images reconstructed from two sets of independent views while the number of views in each set is unequal. Physical phantom data were employed to validate our proposed noise map estimation methods. In comparison to the existing method, our alternative methods yield reasonably accurate noise map estimation.

14 Claims, 6 Drawing Sheets

US 9,031,297 B2

ALTERNATIVE NOISE MAP ESTIMATION METHODS FOR CT IMAGES

FIELD OF THE INVENTION

The current invention is generally related to noise map estimation, and more particularly related to noise map estimation using CT images of various image sets.

BACKGROUND OF THE INVENTION

A noise map is generally useful in image denoising algorithms. Although some methods for noise estimation had been described in prior art, they are generally not applied to CT images. One prior art method includes even-and-odd view method that estimates the noise map for a CT image based two images respectively reconstructed from even and odd numbered views. A difference image is generated from the two reconstructed images, and a noise map is estimated from the difference image.

The even-and-odd view method possesses some interesting features. Firstly, only two sets of the views are involved in the reconstruction procedure. Namely, one set contains even numbered views while the other set contains odd numbered views. Secondly, views in the two sets are exclusive, i.e., a view is included in either one set containing even numbered views or the other set containing odd numbered views. This feature is also referred to as independent, exclusive or uncorrelated views. Thirdly, the number of views within each set is equal in the even-and-odd views approach.

The above discussed requirements for the view sets are rather limited in estimating a noise map for the CT image. It is desirable to generalize the above requirements on the view sets.

BRIEF DESCRIPTION OF THE DRAWINGS

FIG. 5 (b) is a plot comparing the results of the second embodiment (Method 2) to 1200 views and the prior art even-and-odd view method.

FIG. 5 (c) is a plot comparing the results of the third embodiment (Method 3) to 1200 views and the prior art even-and-odd view method.

DETAILED DESCRIPTION OF THE PREFERRED EMBODIMENT(S)

Figure 1:
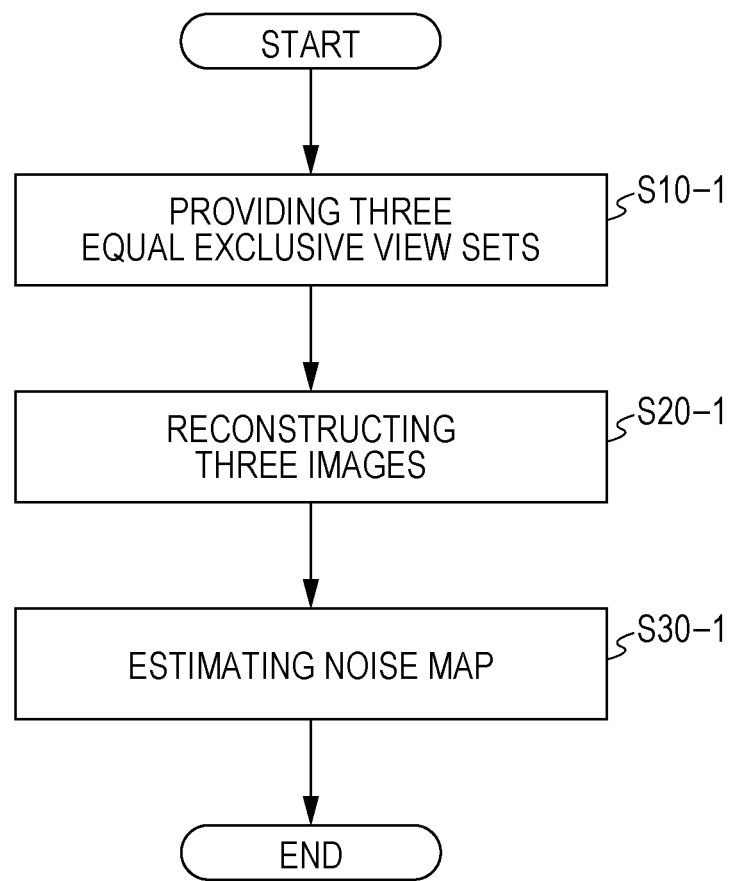
FIG. 1 is a flow chart illustrating steps or acts involved in a first embodiment of a method of estimating a noise map according to the current invention.

In attempting to generalize the above prior art even-and-odd view method for estimating a noise map for CT images, certain aspects of the above features are involved in embodiments according to the current invention. In general, a first embodiment for noise map estimation utilizes three images which are respectively reconstructed from three sets of independent views. A second embodiment for noise map estimation utilizes two images reconstructed from two sets whose views are not exclusive to the sets. That is, a view is optionally included in both sets, and this approach is referred to as a correlated view method. A third embodiment for noise map estimation utilizes two images reconstructed from two sets of unequal number of views. In estimating a noise map according to the embodiments according to the current invention, physical phantom images are reconstructed from data collected by the Aquilion 64TM CT scanner, Toshiba America Medical Systems, Tustin, Calif., USA.

To understand the difference between the embodiments according to the current invention and the prior art even-and-odd views method, the prior art even-and-odd views method is reviewed in some detail before the embodiments according to the current invention are described. Assuming m projection views are collected from a CT scanner in estimating a noise map in the prior art even-and-odd views method, the m projection views containing even-numbered views and odd-numbered views are grouped into an even-numbered view set and an odd-numbered view set. The view sets contain the same number of projection views in the prior art even-and-odd views method. $X_1$ and $X_2$ respectively denote a first image that is reconstructed from the even-numbered view set and a second image that is reconstructed from the odd-numbered view set.

Due to the noise buried in the first and second images $X_1$ and $X_2$, the following relationship exists as defined in Equations (1) and (2) in the first embodiment according to the current invention.

$$X_1 = f + N_1 \quad (1)$$

and $$X_2 = f + N_2 \quad (2)$$

where the image f is noise-free. The quantities $N_1$ and $N_2$ are the zero mean noise images respectively associated with the first image $X_1$ and the second image $X_2$. Let F denote the final image reconstructed by using the total m projection views. The relationship among the final image F, the first image $X_1$ and the second image $X_2$ is defined in Equation (3).

$$F = \tfrac{1}{2}(X_1 + X_2) \quad (3)$$

In the prior art even-and-odd views method, the variance map of the final image F is estimated by the first image $X_1$ and the second image $X_2$. Assuming that the noise in the first zero mean noise image $N_1$ and the second zero mean noise image $N_2$ are uncorrelated, the variance map of the final image F is defined by Equation (4).

$$\mathrm{Var}\{F\} = \tfrac{1}{4}\mathrm{Var}\{X_2 - X_1\} \quad (4)$$

where the symbol Var{ } denotes the variance of a random variable. This result means that in order to estimate the noise map of the final image F, one need only take the difference between the two intermediate images $X_1$ and $X_2$ and measure the variance of the difference image.

In a first embodiment according to the current invention, a process or method estimates a noise map based upon three CT images that are respectively reconstructed from three sets of views. Similar to the even-and-odd views method, the first embodiment requires that each of the views is included only in one of the three view sets. It is assumed that a total number of m views is involved for tomographic reconstruction. Furthermore, the m views are equally partitioned into the three sets of views, and each set of the views is utilized for generating a tomographic reconstruction image. Let $X_1$, $X_2$ and $X_3$ respectively denote the images reconstructed from each of the three sets. The three images $X_1$, $X_2$ and $X_3$ are modeled and defined by Equation (5):

$$X_i = f + N_i \qquad (5)$$

where i=1, 2 and 3, f is the image without noise, Ni is noise buried in the reconstructed images. Furthermore, let F denote the image reconstructed from the total number of m views which is formed as follows by Equation (6):

$$F = \frac{1}{3}(X_1 + X_2 + X_3) \qquad (6)$$

The subsequent task of one embodiment in the process according to the current invention is to estimate Var{F} by using the three reconstructed images $X_1$, $X_2$ and $X_3$. Since the images $X_1$, $X_2$ and $X_3$ are reconstructed from independent views, it is assumed that the noises in the images are also uncorrelated. The variance map of the final image Var{F} is defined by the following Equation (7), $$\text{Var}\{F\} = \frac{1}{9}[\text{Var}\{N_1\} + \text{Var}\{N_2\} \text{Var}\{N_3\}] \qquad (7)$$

To estimate the noise map Var{F}, three intermediate images are defined by Equations (8), (9) and (10).

$$Y_1 = X_1 - X_2 \qquad (8)$$

$$Y_2 = X_1 - X_3 \qquad (9)$$

and $$Y_3 = X_2 - X_3 \qquad (10)$$

The variance of Yi's are defined by Equations (11), (12) and (13).

$$\text{Var}\{Y_1\} = \text{Var}\{N_1\} + \text{Var}\{N_2\} \qquad (11)$$

$$\text{Var}\{Y_2\} = \text{Var}\{N_1\} + \text{Var}\{N_3\} \qquad (12)$$

$$\text{Var}\{Y_3\} = \text{Var}\{N_2\} + \text{Var}\{N_3\} \qquad (13)$$

With the relationships above, it is verified that $$\text{Var}\{F\} = \frac{1}{18}(\text{Var}\{Y_1\} + \text{Var}\{Y_2\} + \text{Var}\{Y_3\}) \qquad (14)$$

An interesting feature of this approach is that the noise map of the images $X_1$, $X_2$ and $X_3$ is estimated by simultaneously solving Equations (5), (11), (12) and (13).

Now referring to FIG. 1, a flow chart illustrates steps or acts involved in a first embodiment of a method of estimating a noise map according to the current invention. The first embodiment provides three sets of the views, and each of the views is included only in one of the three view sets in a step S10-1. In other words, a total number of m views is equally partitioned into the three sets of views. In a step S20-1, the three sets of the views are utilized to reconstruct tomographic images $X_1$, $X_2$ and $X_3$ as defined by Equation (5). Furthermore, let F denote the image reconstructed from the total number of m views which is formed as follows by Equation (6).

Still referring to FIG. 1, the subsequent task of the first embodiment in the process according to the current invention is to estimate a noise map by using the three reconstructed images $X_1$, $X_2$ and $X_3$. Since the images $X_1$, $X_2$ and $X_3$ are reconstructed from independent views in the step S20-1, it is assumed that the noises in the images are also uncorrelated in a step S30-1. The variance map of the final image Var{F} is defined by Equation (7). To estimate the noise map Var{F} in the step S30-1, intermediate images Ware defined by Equations (8), (9) and (10). The variance of Yi's are defined by Equations (11), (12) and (13). With the relationships above, the noise map Var{F} is determined based upon Equation (14) in the step S30-1, and the noise map of the images $X_1$, $X_2$ and $X_3$ is estimated by simultaneously solving Equations (5), (11), (12) and (13).

In a second embodiment according to the current invention, a process or method estimates a noise map based upon two CT images that are respectively reconstructed from two sets of views. In the second embodiment, a noise map is estimated via images that are reconstructed from correlated views. In this regard, let us assume an image X is reconstructed from n views out of the total number of m views. Based upon the above assumption, an image X is reconstructed from n views and is expressed by Equation (15):

$$X = f + N_1 \qquad (15)$$

where f is the noise free image and $N_1$ is the associated zero mean noise image.

Let F denote the image reconstructed by using the total number of m views. The following relationship holds $$F = f + N_2 \qquad (16)$$

where $N_2$ is associated noise image reconstructed by using the total number of m projection views. The subsequent task of the second embodiment in the process according to the current invention is to estimate Var{F} by using the two images X and F. Since the noise images $N_1$ and $N_2$ are correlated, the variance map of the final image volume is approximated by Equation (17):

$$\text{Var}\{F\} = \frac{n}{m-n} \text{Var}\{F - X\} \qquad (17)$$

It should be noted that if n=m/2, the same result is achieved as the prior art even-and-odd views method.

Let us assume the noise image from each projection view after the filtered backprojection (FBP) algorithm is independently and identically distributed. Since the image X is reconstructed by using n projection views, the image X contains n averaged noise images as expressed in Equation (18):

$$X = f + N_1 = f + \frac{1}{n}\sum_{i=1}^{n} \tilde{N}_i \qquad (18)$$

where $\tilde{N}_i$ is the noise image reconstructed by using a predetermined FBP algorithm from the noise contained in each projection view. Similarly, the final image F is expressed in Equation (19).

$$F = f + N_2 = f + \frac{1}{m}\sum_{i=1}^{m} \tilde{N}_i \qquad (19)$$

In other words, Equations (20) and (21) are respectively related to Equations (18) and (19) to account for the correlated views in the two sets.

$$N_1 = \frac{1}{n}\sum_{i=1}^{n} \tilde{N}_i \qquad (20)$$

and $$N_2 = \frac{1}{m}\sum_{i=1}^{m} \tilde{N}_i. \qquad (21)$$

It is assumed that the noise images, $\tilde{N}_i = 1, \ldots, m$, are independently and identically distributed with zero mean and variance $\sigma^2$. With the assumptions, Equations (22) and (23) determines the variance for the image X and the final image F.

$$\text{Var}\{X\} = \frac{1}{n}\sigma^2 \quad (22)$$

and $$\text{Var}\{F\} = \frac{1}{m}\sigma^2 \quad (23)$$

To estimate the noise map of the image F, the value of $\sigma^2$ is necessary. A new image is defined by Equation (24).

$$F - X = N_2 - N_1 \quad (24)$$

It should be noted that the noise images $N_1$ and $N_2$ are now correlated. The variance of the new image, $\text{Var}\{F-X\}$ is now computed in Equation (25).

$$\text{Var}\{F-X\} = \text{Var}\{N_2\} + \text{Var}\{N_1\} - 2\text{Cov}\{N_2, N_1\} \quad (25)$$

where $\text{Cov}\{N2, N1\}$ denotes the covariance between the images $N_2$ and $N_1$. By definition, $$\text{Cov}\{N_2, N_1\} = E\left\{\frac{1}{m}\sum_{j=1}^{m}\tilde{N}_j \frac{1}{n}\sum_{i=1}^{n}\tilde{N}_i\right\} \quad (26)$$

where $E\{\}$ denotes the expectation value of a random variable. Rearranging the covariance of Equation (26), Equation (27) is obtained:

$$\text{Cov}\{N_2, N_1\} = \frac{1}{mn}\sum_{j=1}^{m}\sum_{i=1}^{n}E\{\tilde{N}_j \tilde{N}_i\} \quad (27)$$

Since it is assumed that the noise images are independently and identically distributed, $E\{\tilde{N}_j \tilde{N}_i\}$ is defined by equation (28):

$$E\{\tilde{N}_j \tilde{N}_i\} = \sigma^2 \delta_{ij} \quad (28)$$

where $\delta_{ij} = 1$ if $i = j$ and otherwise $\delta_{ij} = 0$. Therefore, the quantity $\text{Cov}\{N_2, N_1\}$ assumes a simple expression as defined in Equation (29):

$$\text{Cov}\{N_2, N_1\} = \frac{1}{mn}\{n\sigma^2\} = \frac{1}{m}\sigma^2 \quad (29)$$

where it is based upon the fact that $n < m$. On substitution of Equations (22), (23) and (29) into Eqn. (25), we have $$\text{Var}\{F-X\} = \frac{m-n}{mn}\sigma^2 \quad (30)$$

and hence Equation (17) is obtained.

Figure 2:
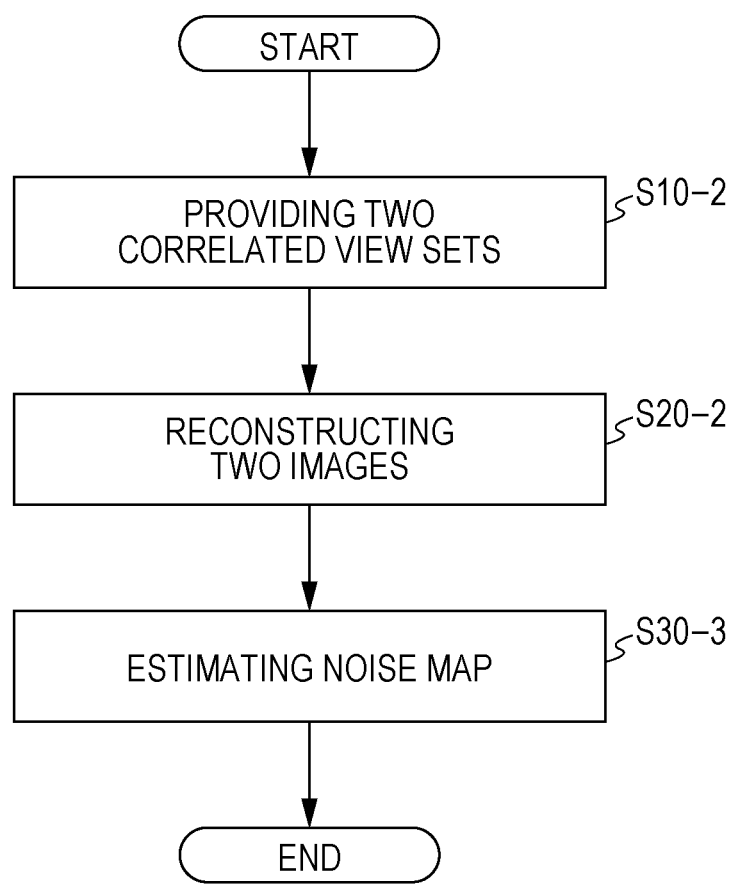
FIG. 2 is a flow chart illustrating steps or acts involved in a second embodiment of a method of estimating a noise map according to the current invention.

Now referring to FIG. 2, a flow chart illustrates steps or acts involved in a second embodiment of a method of estimating a noise map according to the current invention. The second embodiment provides two sets of views that are correlated and not exclusive in a step S10-2. In this regard, that is a single view optionally belongs to the two sets. In a step S10-2, an image X is reconstructed from n views out of the total number of m view as expressed by Equation (15). Similarly, a final image F is reconstructed by using the total number of in views as expressed by Equation (16) in the step S10-2. Although a number of the views n is smaller than the total number of views m, the views are not exclusive between the two sets.

Still referring to FIG. 2, the subsequent task of the second embodiment in the process according to the current invention is to estimate $\text{Var}\{F\}$ by using the two images X and F. Since the noise images $N_1$ and $N_2$ are correlated, the variance map of the final image volume is approximated by Equation (17) in a step S10-3. It is assumed that the noise image from each projection view after the filtered backprojection (FBP) algorithm is independently and identically distributed. Since the image X is reconstructed by using n projection views in the step S10-2, the image X contains n averaged noise images as expressed in Equation (18). Similarly, the final image F is expressed in Equation (19). It is further assumed in the step S10-3 that the noise images, $\tilde{N}_i = 1, \ldots, m$, are independently and identically distributed with zero mean and variance $\sigma^2$. With the assumptions, Equations (22) and (23) determines the variance for the image X and the final image F. To estimate the noise map of the image F in the step S10-3, the value of $\sigma^2$ is necessary and a new image is defined by Equation (24). The variance of the new image, $\text{Var}\{F-X\}$ is now computed in Equation (25) to obtain Equation (17) via Equation (30).

In a third embodiment according to the current invention, a process or method estimates a noise map based upon two CT images that are respectively reconstructed from two sets of views. In the third embodiment, a noise map is estimated via images that are reconstructed from unequal numbered independent views. That is, the two sets have a different number of the views, but no single view is shared between the two sets. In this approach, it is assumed that two images X and Y are respectively reconstructed from n and m−n views, where m is a total number of views in the reconstruction and n<m. As already discussed in the above embodiments, the two images are defined by Equations (31) and (32).

$$X = f + N_1 \quad (31)$$

and $$Y = f + N_2 \quad (32)$$

where f is the noise-free image while $N_1$ and $N_2$ are noise images of zero means associated with the images X and Y respectively. The final image F reconstructed by the total number of in views is formed as defined by Equation (33):

$$F = \frac{n}{m}X + \frac{m-n}{m}Y \quad (33)$$

The subsequent task of the second embodiment in the process according to the current invention is to estimate $\text{Var}\{F\}$ by using the two reconstructed images X and Y. Similarly, it is assumed as expressed in Equation (34):

$$N_1 = \frac{1}{n}\sum_{i=1}^{n}\tilde{N}_i \quad (34)$$

and $$N_2 = \frac{1}{m-n}\sum_{i=1}^{m-n}\tilde{N}_i \quad (35)$$

Here the noise images in $N_1$ are uncorrelated to the noise images in $N_2$. It is assumed that they have zeros means and variances. The variance of the images X and Y are defined by Equations (36) and (37):

$$\text{Var}\{X\} = \text{Var}\{N_1\} = \frac{1}{n}\sigma^2 \quad (36)$$

and $$\text{Var}\{Y\} = \text{Var}\{N_2\} = \frac{1}{m-n}\sigma^2 \quad (37)$$

The noise estimation of the final image F is defined by Equation (38)

$$\text{Var}\{F\} = \frac{n^2}{m^2}\text{Var}\{X\} + \frac{(m-n)^2}{m^2}\text{Var}\{Y\} = \frac{1}{m}\sigma^2 \quad (38)$$

To estimate the quantity, we formulate an intermediate image Y−X whose noise map is as defined in Equation (39):

$$\text{Var}\{Y - X\} = \text{Var}\{N_2\} + \text{Var}\{N_1\} = \frac{m}{(m-n)n}\sigma^2 \quad (39)$$

Substitution of Equation (39) into Equation (38) yields the desired noise map is obtained in Equation (40).

$$\text{Var}\{F\} = \frac{(m-n)^2}{m^2}\text{Var}\{Y - X\} \quad (40)$$

Figure 3:
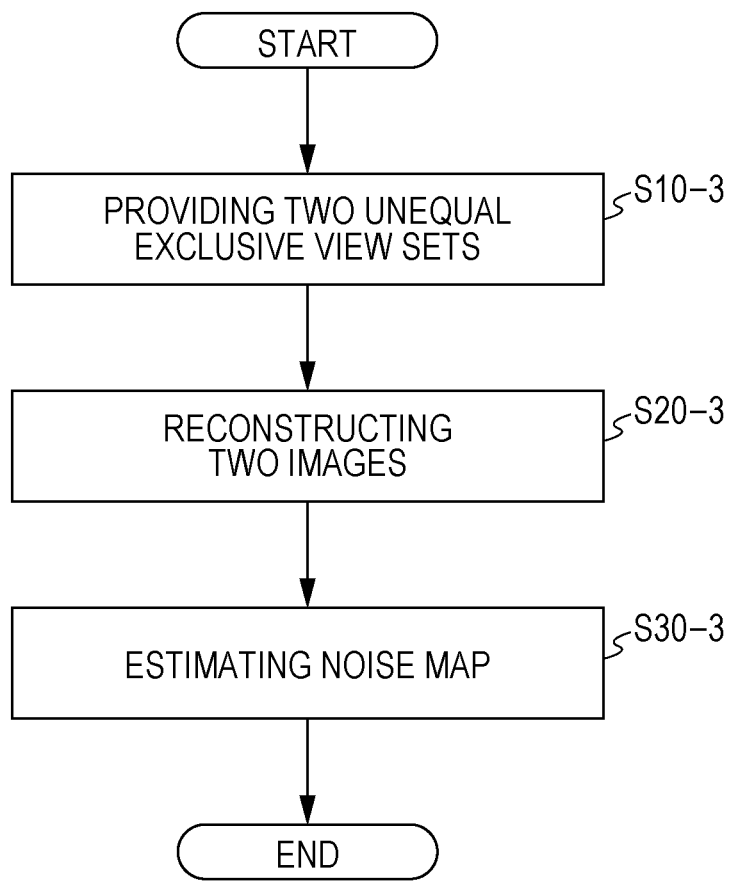
FIG. 3 is a flow chart illustrating steps or acts involved in a third embodiment of a method of estimating a noise map according to the current invention.

Now referring to FIG. 3, a flow chart illustrates steps or acts involved in a third embodiment of a method of estimating a noise map according to the current invention. The third embodiment provides two sets of unequal numbered independent views in a step S10-3. That is, the two sets have a different number of the views, but no single view is shared between the two sets. In a step S20-3, two images X and Y are respectively reconstructed from n and m-n views, where in is a total number of views in the reconstruction and n<m as defined by Equations (31) and (32). The final image F reconstructed by the total number of m views is formed as defined by Equation (33).

Still referring to FIG. 3, the subsequent task of the third embodiment in the process according to the current invention is to estimate Var{F} by using the two reconstructed images X and Y as well as noise images expressed in Equations (34) and (35). The variance of the images X and Y are defined in Equations (36) and (37). The noise estimation of the final image F is expressed in Equation (38). To estimate the quantity, an intermediate image Y−X whose noise map is as defined in Equation (39), and substitution of Equation (39) into Equation (38) yields the desired noise map as defined in Equation (40) in a step S30-3.

Figure 4:
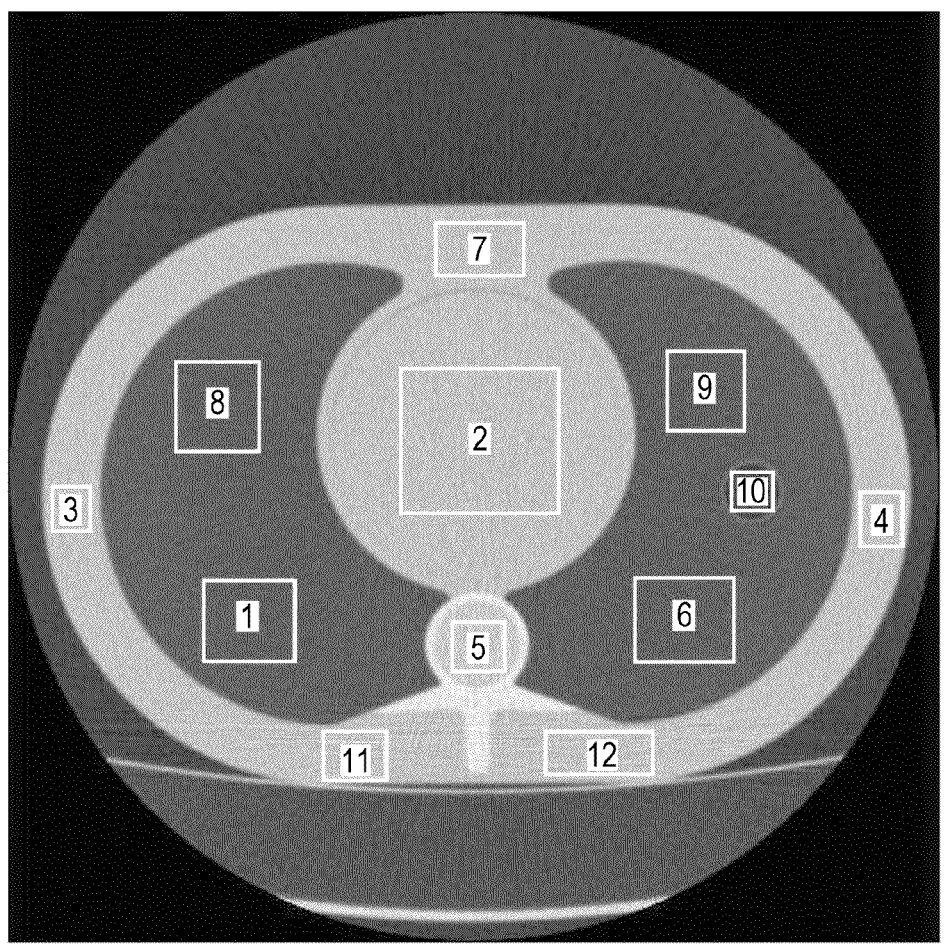
FIG. 4 shows the image and twelve regions of interest (ROI's) according to the current invention.

FIG. 4 shows the image and twelve regions of interest (ROI's) according to the current invention. The image is reconstructed from real phantom data collected from Aquilion 64TM CT scanner (Toshiba America Medical Systems, Tustin, Calif., USA). The twelve ROI's are manually selected. Standard deviations (SD) are computed from the image that has been reconstructed by using the total number of 1200 views, and the SD is served as gold standard for comparisons. For a comparison purpose, the even-and-odd view method is used as a reference.

Figure 5A:
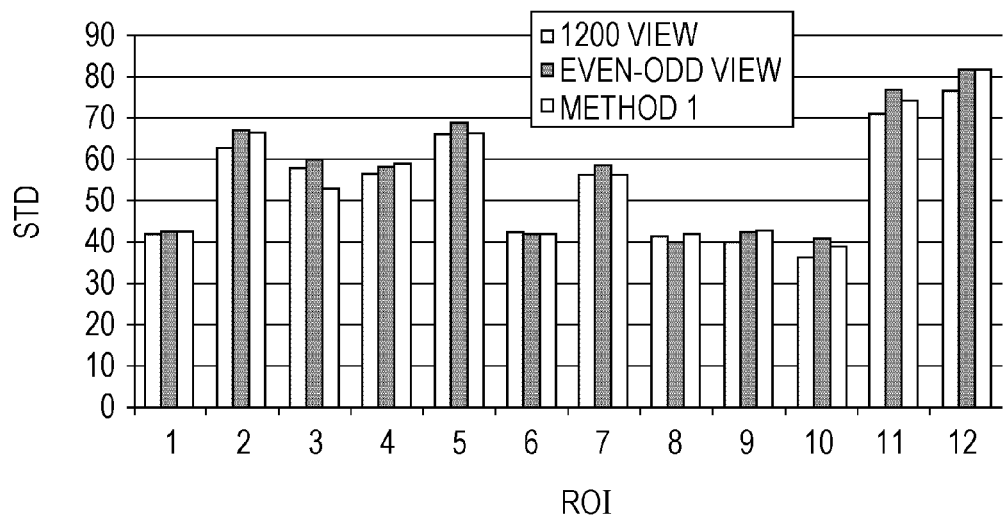
FIG. 5 (a) is a plot comparing the results of the first embodiment (Method 1) to 1200 views and the prior art even-and-odd view method.
Figure 5B:
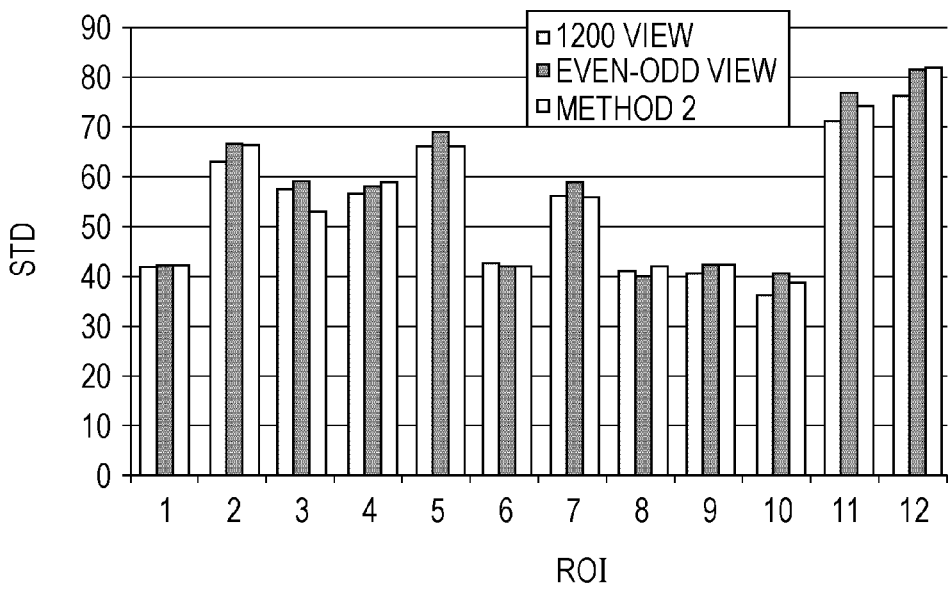
Figure 5C:
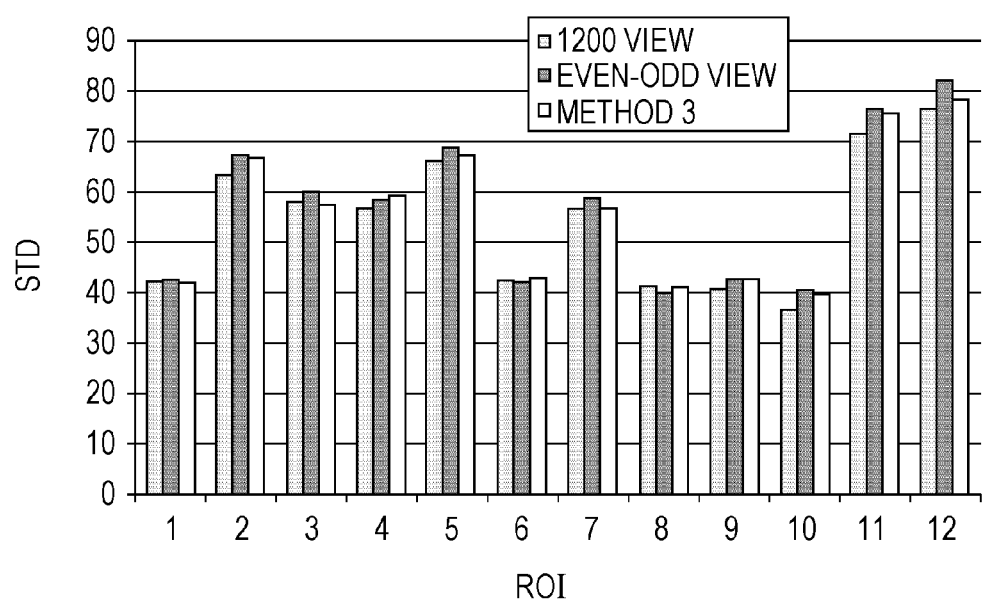

FIG. 5 shows the results to indicate that the above embodiments of the methods for estimating the noise map according to the current invention produced as accurate results as the existing method and the manually computed results. FIG. 5A compares the results according to the first embodiment (Method 1) to 1200 views as described above and the prior art even-and-odd view method in the twelve ROI's of FIG. 4. FIG. 5B compares the results according to the second embodiment (Method 2) to 1200 views as described above and the prior art even-and-odd view method in the twelve ROI's of FIG. 4. FIG. 5C compares the results according to the third embodiment (Method 3) to 1200 views as described above and the prior art even-and-odd view method in the twelve ROI's of FIG. 4.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of estimating a noise map from reconstructed images, comprising:
acquiring data for a predetermined first number of views;
grouping the views into two groups with some of the views that are correlated between the two groups, one of the two groups having a predetermined second number of the views, the other one of the two groups having a predetermined third number of the views, either one of the predetermined second number and the predetermined third number being less than the predetermined first number of the views;
reconstructing two images from the two groups of the views; and estimating variance based upon the two reconstructed images and a weight.

2. The method of estimating a noise map from reconstructed images according to claim 1 wherein the other one of the predetermined second number and the predetermined third number equals to the predetermined first number of the views.

3. The method of estimating a noise map from reconstructed images according to claim 1 wherein the variance is determined according to $$\text{Var}\{F\} = n/m - n\text{Var}\{F-X\}$$

where F is a first reconstructed image based upon the predetermined first number m of the views, X is a second reconstructed image based upon the predetermined second number n of the views that is less than the predetermined first number m.

4. A method of estimating a noise map from reconstructed images, comprising:
acquiring data for a predetermined first number of views;
grouping the views into a predetermined second number of at least two groups with an unequal number of the views that are independent in each of the groups;
reconstructing an image for each of the groups; and
estimating variance based upon a sum of variance in intermediate images each generated by a difference between all combinations of two of the reconstructed images.

5. The method of estimating a noise map from reconstructed images according to claim 4 wherein the predetermined second number of the groups is at least three.

6. The method of estimating a noise map from reconstructed images according to claim 4 wherein the predetermined second number of the groups is two while the predetermined first number of views is m.

7. The method of estimating a noise map from reconstructed images according to claim 6 wherein the variance is determined according to $$\mathrm{Var}\{F\}=(m-n)n/m2\mathrm{Var}\{Y-X\}$$

where F is a reconstructed image based upon two reconstructed images X and Y, which are respectively reconstructed from n images and m-n images, the n being smaller than the m.

8. A system for estimating a noise map from reconstructed images, comprising:
    a scanner for acquiring data for a predetermined first number of views;
    an image data processor connected to said scanner for grouping the views into two groups with some of the views that are correlated between the two groups, one of the two groups having a predetermined second number of the views, the other one of the two groups having a predetermined third number of the views, either one of the predetermined second number and the predetermined third number being less than the predetermined first number of the views;
    an image reconstructing unit connected to said image data processor for reconstructing two images from the two groups of the views; and
    a variance estimation unit connected to said image reconstructing unit for estimating variance based upon the two reconstructed images and a weight.

9. The system for estimating a noise map from reconstructed images according to claim 8 wherein the other one of the predetermined second number and the predetermined third number equals to the predetermined first number of the views.

10. The system for estimating a noise map from reconstructed images according to claim 8 wherein the variance is determined according to $$\mathrm{Var}\{F\}=n/m-n\mathrm{Var}\{F-X\}$$

where F is a first reconstructed image based upon the predetermined first number m of the views, X is a second reconstructed image based upon the predetermined second number n of the views that is less than the predetermined first number m.

11. A system for estimating a noise map from reconstructed images, comprising:
    a scanner for acquiring data for a predetermined first number of views;
    an image data processor connected to said scanner for grouping the views into a predetermined second number of at least two groups with an unequal number of the views that are independent in each of the groups;
    an image reconstructing unit connected to said image data processor for reconstructing an image for each of the groups; and
    a variance estimation unit connected to said image reconstructing unit for estimating variance based upon a sum of variance in intermediate images each generated by a difference between all combinations of two of the reconstructed images.

12. The system for estimating a noise map from reconstructed images according to claim 11 wherein the predetermined second number of the groups is at least three.

13. The system for estimating a noise map from reconstructed images according to claim 11 wherein the predetermined second number of the groups is two while the predetermined first number of views is m.

14. The system for estimating a noise map from reconstructed images according to claim 13 wherein the variance is determined according to $$\mathrm{Var}\{F\}=(m-n)n/m2\mathrm{Var}\{Y-X\}$$

where F is a reconstructed image based upon two reconstructed images X and Y, which are respectively reconstructed from n images and m−n images, the n being smaller than the m.

* * * * *